United States Patent
Dorenbosch et al.

[11] Patent Number: 6,055,229
[45] Date of Patent: Apr. 25, 2000

[54] METHOD AND APPARATUS IN A WIRELESS COMMUNICATION SYSTEM FOR DYNAMICALLY FORMATTING APPLICATION DATA TO BE TRANSMITTED

[75] Inventors: Jheroen Pieter Dorenbosch, Paradise; Steven Jeffrey Goldberg, Fort Worth, both of Tex.

[73] Assignee: Motorola, Inc., Schaumburg, Ill.

[21] Appl. No.: 09/106,613

[22] Filed: Jun. 29, 1998

[51] Int. Cl.[7] .................................................. H04N 3/14
[52] U.S. Cl. ........................... 370/313; 370/310; 455/452
[58] Field of Search .................................. 370/310, 312, 370/313, 401; 713/200, 201; 380/21, 30; 455/452

[56] References Cited

U.S. PATENT DOCUMENTS 5,371,794  12/1994  Diffie ........................................... 380/21
5,732,074   3/1998  Spaur ........................................ 370/313

*Primary Examiner*—Ajit Patel
*Assistant Examiner*—Ricardo M. Pizarro
*Attorney, Agent, or Firm*—R. Louis Breeden

[57] ABSTRACT

A device (124, 122) having application data to transmit collects (502) information concerning data transport capabilities affecting transmission timing of at least one wireless link available for transmitting the application data, and calculates (506), from the information, a maximum amount of data that can be completed through the at least one wireless link by a predetermined time. The device then determines (508), when attainable, from the application data and from a predetermined set of user-presentation formats possible for the application data, a user-presentation format that requires less than the maximum amount of data. The device then formats (514) the application data in accordance with the user-presentation format before transmitting the application data (530).

19 Claims, 3 Drawing Sheets

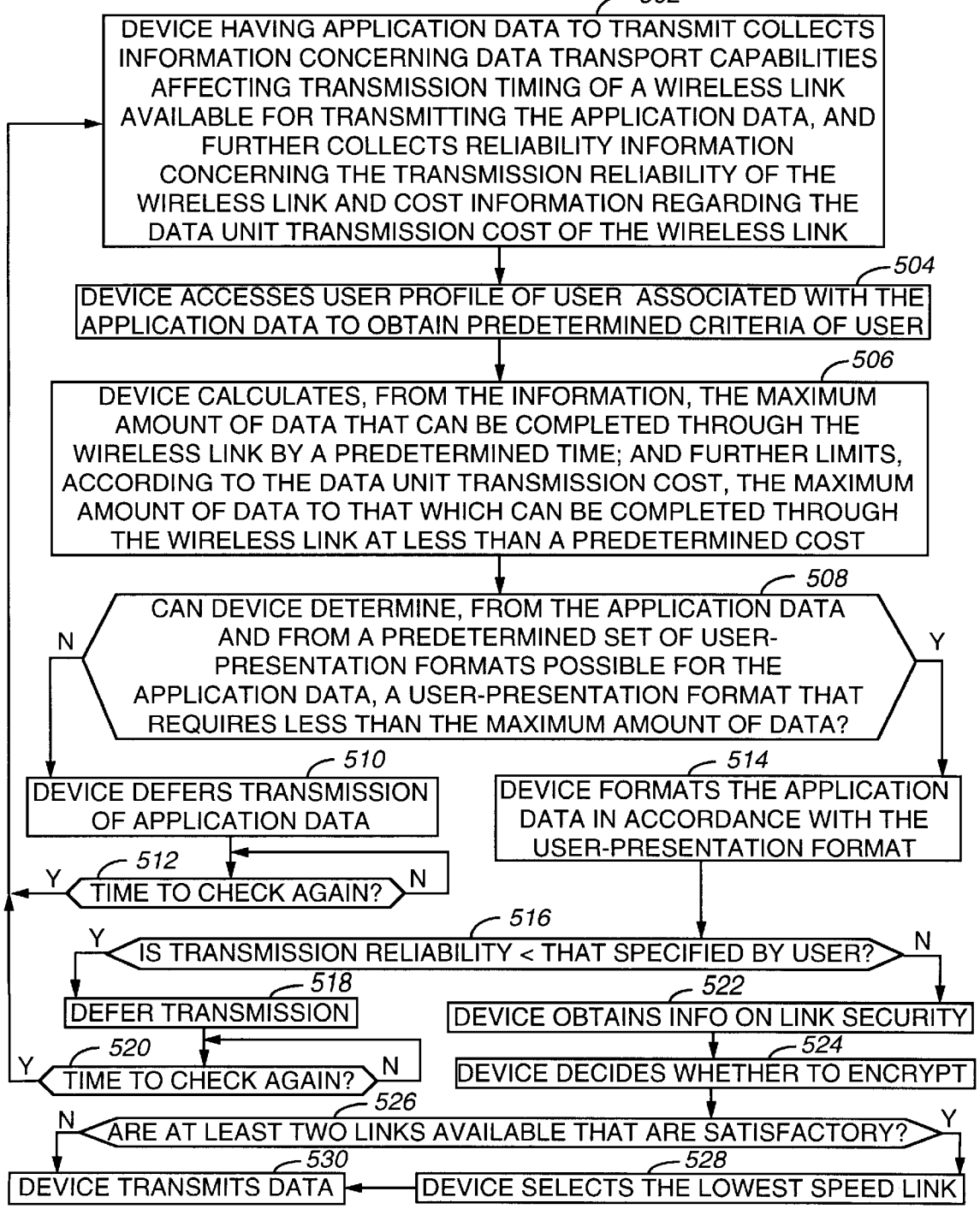

METHOD AND APPARATUS IN A WIRELESS COMMUNICATION SYSTEM FOR DYNAMICALLY FORMATTING APPLICATION DATA TO BE TRANSMITTED

FIELD OF THE INVENTION

This invention relates in general to wireless communication systems, and more specifically to a method and apparatus in a wireless communication system for dynamically formatting application data to be transmitted.

BACKGROUND OF THE INVENTION

Wireless communication systems are becoming increasingly applications oriented. Applications communicate end-to-end via wired links and over-the-air (OTA) links between a subscriber unit and another device, such as a server, a controller, or another subscriber unit. Depending upon the location of the subscriber unit, the capacity of the OTA links can vary widely.

As a result, applications generally format their data assuming the lowest expected link capacity. Alternatively, applications can use a more voluminous format, but a high latency penalty results when a slow link happens to be used. As wireless communication systems develop further into higher speeds, it is expected that even greater variations in link capacity and link quality will be encountered.

Thus, what is needed is a method and apparatus in a wireless communication system that can dynamically format application data to be transmitted, in response to variations in link capacity and quality. Preferably, the method and apparatus will consider transmission cost and reliability, as well as transmission time, and will be user-customizable.

SUMMARY OF THE INVENTION

An aspect of the present invention is a method in a wireless communication system for dynamically formatting application data to be transmitted. The method comprises the steps of collecting information concerning data transport capabilities affecting transmission timing of at least one wireless link available for transmitting the application data; and calculating, from the information, a maximum amount of data that can be completed through the at least one wireless link by a predetermined time. The method further comprises the steps of determining, when attainable, from the application data and from a predetermined set of user-presentation formats possible for the application data, a user-presentation format that requires less than the maximum amount of data; and formatting the application data in accordance with the user-presentation format before transmitting the application data.

Another aspect of the present invention is a server in a wireless communication system for dynamically formatting application data to be transmitted. The server comprises a network interface for communicating application data with a portion of the wireless communication system, which will transmit the application data over at least one wireless link available for transmitting the application data; and a processing system coupled to the network interface for processing the application data. The processing system is programmed to collect information concerning data transport capabilities affecting transmission timing of the at least one wireless link; and to calculate, from the information, a maximum amount of data that can be completed through the at least one wireless link by a predetermined time. The processing system is further programmed to determine, when attainable, from the application data and from a predetermined set of user-presentation formats possible for the application data, a user-presentation format that requires less than the maximum amount of data; and to format the application data in accordance with the user-presentation format before transmitting the application data.

Another aspect of the present invention is a subscriber unit in a wireless communication system for dynamically formatting application data to be transmitted. The subscriber unit comprises a receiver for receiving information concerning data transport capabilities affecting transmission timing of at least one wireless link available for transmitting the application data, and a processing system coupled to the receiver for processing the information. The subscriber unit further comprises a transmitter coupled to the processing system for transmitting the application data over the at least one wireless link. The processing system is programmed to collect the information; and to calculate, from the information, a maximum amount of data that can be completed through the at least one wireless link by a predetermined time. The processing system is further programmed to determine, when attainable, from the application data and from a predetermined set of user-presentation formats possible for the application data, a user-presentation format that requires less than the maximum amount of data; and to format the application data in accordance with the user-presentation format before transmitting the application data.

BRIEF DESCRIPTION OF THE DRAWINGS

FIG. 4 is a diagram depicting an exemplary link communication in accordance with the present invention.

FIG. 5 is a flow diagram depicting operation of the wireless communication system in accordance with the present invention.

DETAILED DESCRIPTION OF THE DRAWINGS

Figure 1:
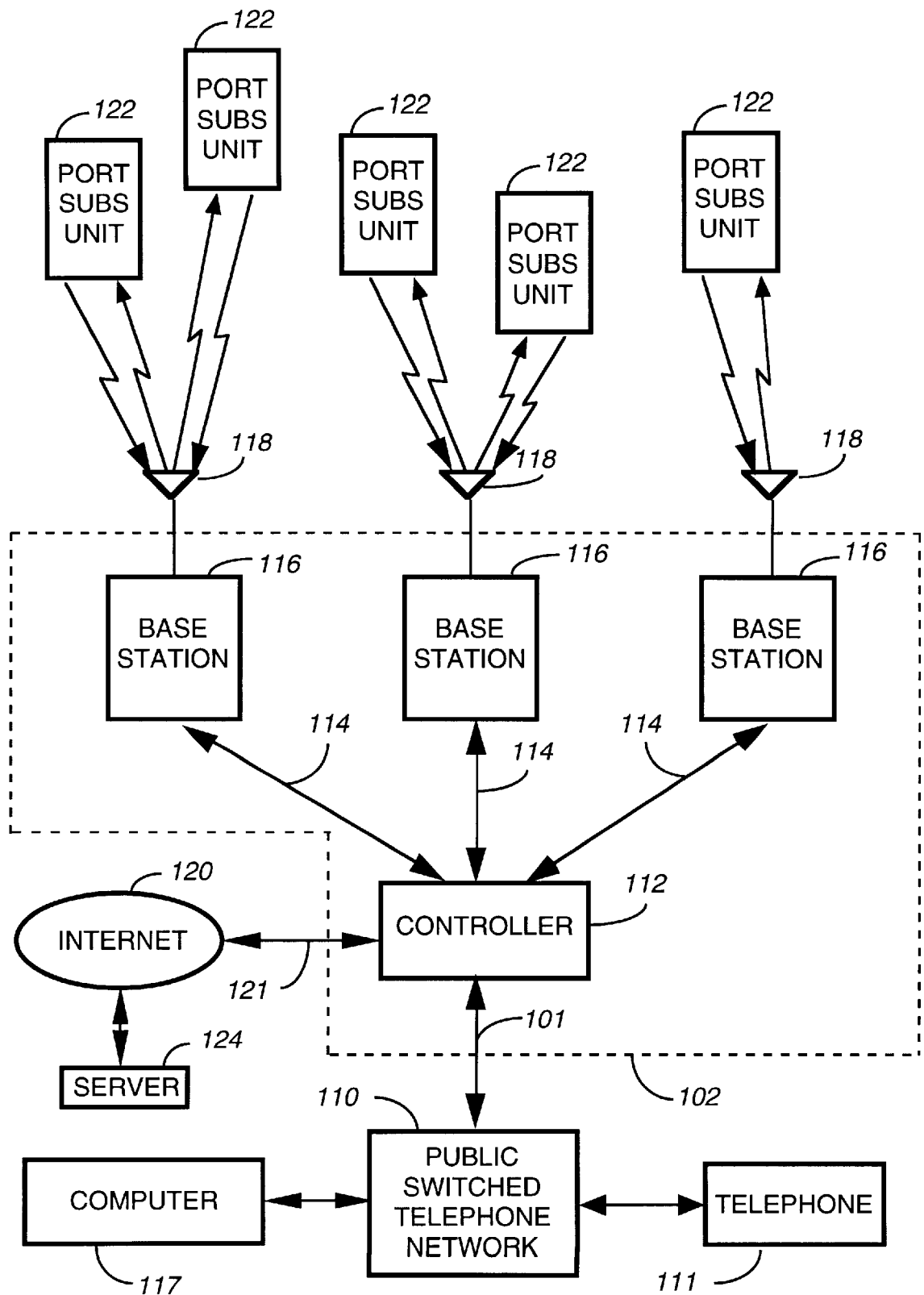
FIG. 1 is an electrical block diagram of an exemplary wireless communication system in accordance with the present invention.

Referring to FIG. 1, an electrical block diagram depicts an exemplary wireless communication system in accordance with the present invention, comprising an infrastructure portion 102 including a controller 112 and a plurality of conventional base stations 116, the communication system also including a plurality of portable subscriber units 122. The base stations 116 preferably communicate with the portable subscriber units 122 utilizing conventional radio frequency (RF) techniques, and are coupled by conventional communication links 114 to the controller 112, which controls the base stations 116.

The controller 112 is preferably a combination of the Wireless Messaging Gateway (WMG™) Administrator! paging terminal, and the RF-Conductor!™ message distributor manufactured by Motorola, Inc. The base stations 116 are preferably a combination of the RF-Orchestra! transmitter and RF-Audience!™ receiver manufactured by Motorola, Inc. The portable subscriber units 122 are preferably similar to PageWriter™2000 data messaging units, also manufactured by Motorola, Inc., and have software modified in accordance with the present invention. It will be appreciated that other similar equipment can be utilized as well for the controller 112, the base stations 116, and the portable subscriber units 122.

Each of the base stations 116 transmits RF signals to the portable subscriber units 122 via an antenna 118. The base stations,; 116 preferably each receive RF signals from the plurality of portable subscriber units 122 via the antenna 118. The RF signals transmitted by the base stations 116 to the portable subscriber units 122 (outbound messages) comprise selective call addresses identifying the portable subscriber units 122, and data messages originated by message originators, as well as commands originated by the controller 112 for adjusting operating parameters of the radio communication system, and application data from a server 124, formatted in accordance with the present invention, as described further below. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as application data messages formatted in accordance with the present invention. It will be appreciated that more than one wireless link can be available for transmission between the base stations 116 and a portable subscriber unit 122.

It will be further appreciated that, when multiple links are available, the multiple links can operate at different transmission speeds, have different latencies, cost different amounts to use, have different transmission reliabilities, and use different levels of security. An aspect of the present invention is for an entity having application data to transmit to consider some or all of these data transport capabilities before selecting a link and a user-presentation format for the application data. Preferably, the controller 112 maintains a database of the current data transport capabilities of the links available in the wireless communication system, through well-known techniques. The database is accessible by other entities of the wireless communication system that have application data to send. In addition, the controller 112 maintains a user profile corresponding to each user of the wireless communication system. The user profile comprises user preferences and service criteria, in accordance with the present invention. It will be appreciated that, alternatively, the wireless communication system can define a default user profile that is utilized by a plurality of users. The user can be located on either the wireline side or the wireless side of the system, and can be either a person or a device.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. In addition, the controller 112 preferably is coupled through a conventional communication link 121 to the Internet 120 for acquiring information, e.g., application data, from at least one server 124 also coupled to the Internet. It will be appreciated that, alternatively, the server 124 can be coupled to the controller 112 through a conventional local or wide area network, as well as through a dedicated link. It will be further appreciated that the server 124 can be included as an integral portion of the controller 112, as well.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well.

Figure 2:
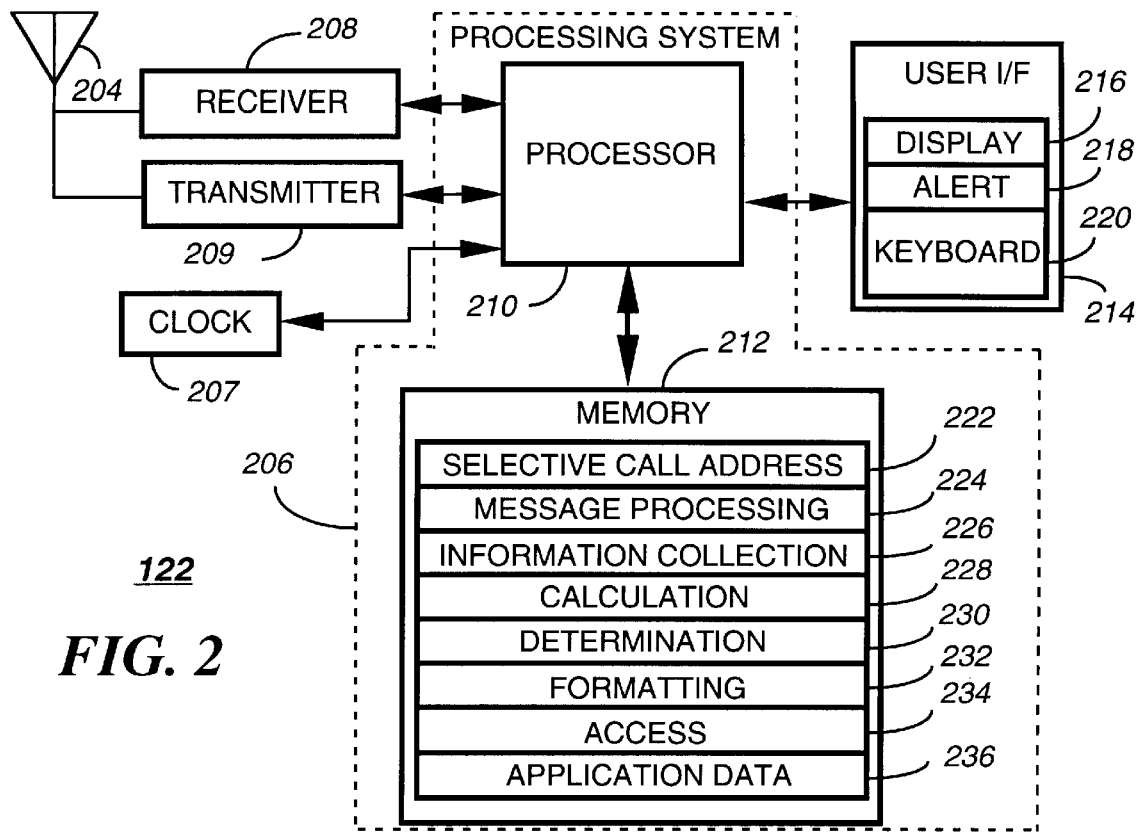
FIG. 2 is an electrical block diagram of an exemplary subscriber unit in accordance with the present invention.

FIG. 2 is an electrical block diagram of an exemplary portable subscriber unit 122 in accordance with the present invention. The portable subscriber unit 122 comprises an antenna 204 for intercepting an outbound message and for transmitting an inbound message. The antenna 204 is coupled to a conventional receiver 208 for receiving the outbound message and coupled to a conventional transmitter 209 for transmitting the inbound message. The receiver 208 and transmitter 209 are coupled to a processing system 206 for processing the outbound and inbound messages and for controlling the portable subscriber unit 122 in accordance with the present invention. A user interface 214 preferably is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the portable subscriber unit 122. A conventional clock 207 is also coupled to the processing system 206 for supporting time keeping requirements of the portable subscriber unit 122.

The processing system 206 comprises a conventional processor 210 and a conventional memory 212, preferably a random access memory (RAM). The memory 212 comprises software elements and other variables for programming the processing system 206 in accordance with the present invention. The memory 212 preferably includes a selective call address 222 to which the portable subscriber unit 122 is responsive. In addition, the memory 212 includes a message processing element 224 for programming the processing system 206 to process messages through well-known techniques. The memory 212 also includes application data 236 to be transmitted. The memory 212 further comprises an information collection program element 226 for programming the processing system 206 to collect information concerning data transport capabilities affecting transmission timing of at least one wireless link available for transmitting the application data 236, in accordance with the present invention. Preferably, the processing system 206 controls the portable subscriber unit 122 to query the base station 116 about the data transport capabilities of the inbound link, e.g., link speed, latency, reliability, and security, when the portable subscriber unit 122 has application data 236 to be transmitted. It will be appreciated that, alternatively, the portable subscriber unit 122 can maintain its own internal records of inbound link performance, based on the success or failure of recent inbound attempts. It will be further appreciated that the portable subscriber unit 122 can also utilize information about the outbound link quality in selecting a format for transmission.

The memory 212 also includes a calculation program element 228 for programming the processing system 206 to calculate, from the information about the inbound link, a maximum amount of data that can be completed through the at least one wireless link by a predetermined time. The predetermined time can be, for example, a criterion stored in a user profile stored in a system entity accessible by the portable subscriber unit 122. In this example, the criterion specifies how long the user is willing to wait for the application data 236 to be transmitted.

In addition, the memory 212 includes a determination element 230 for programming the processing system 206 to determine, when attainable, from the application data 236 and from a predetermined set of user-presentation formats possible for the application data 236, a user-presentation format that requires less than the maximum amount of data. For example, the predetermined set of user-presentation formats can include both color and monochrome display of the application data 236. Depending upon the speed of the link(s) available, the user-presentation format may have to be monochrome in order to require less than the maximum amount of data for transmission. It should be noted that the term "user-presentation format" is meant to include both application layer and presentation layer representation of the application data. Reliability management can reside at the presentation layer. Thus, for example, it is possible to select a user-presentation format that provides a specified transmission reliability, e.g., by using repeated packets or additional error correction.

The memory 212 further comprises a formatting element 232 for programming the processing system 206 to format the application data 236 in accordance with the user-presentation format selected before transmitting the application data. In addition, the memory 212 includes an access element 234 for programming the processing system 206 to access the user profile comprising predetermined criteria, e.g., the desired security, and the maximum waiting time for transmission, for calculating the maximum amount of data for a user; and to calculate the maximum amount of data from the predetermined criteria corresponding to the user. The user profile also preferably specifies selected ones of the predetermined set of user-presentation formats that are acceptable to a user, so that the processing system 206 can determine, from the application data 236 and from the selected ones of the predetermined set of user-presentation formats, a user-presentation format that is acceptable to the user and that requires less than the maximum amount of data. The user profile preferably resides in a memory (not shown) of the controller 112. It will be appreciated that, alternatively, the user profile can reside in another entity of the wireless communication system, e.g., in the server 124 or in the portable subscriber unit 122.

Figure 3:
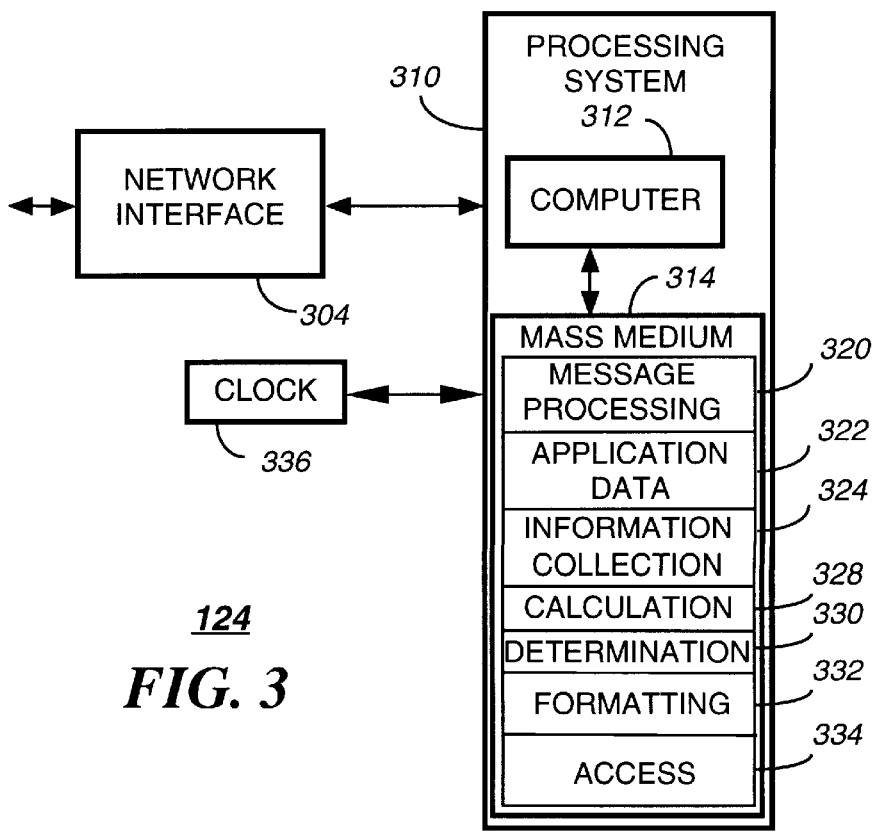
FIG. 3 is an electrical block diagram depicting an exemplary server in accordance with the present invention.

FIG. 3 is an electrical block diagram depicting an exemplary server 124 in accordance with the present invention. The server 124 comprises a conventional network interface 304 for communicating with the portable subscriber unit 122 through the Internet and through the infrastructure portion 102 of the wireless communication system. The network interface 304 is coupled to a processing system 310 for controlling and communicating with the network interface 304. The processing system 310 is also coupled to a conventional clock 336 for providing a timing signal to the processing system 310. The processing system 310 comprises a conventional computer 312 and a memory, preferably a conventional mass medium 314, e.g., a magnetic disk drive, programmed with information and operating software in accordance with the present invention. The mass medium 314 comprises a conventional message processing element 320 for processing messages communicated with the portable subscriber unit 122 through well-known techniques. The mass medium 314 also includes application data 322 for transmission to a portable subscriber unit 122. In addition, the mass medium 314 includes an information collection program element 324 for programming the processing system 310 to collect information concerning data transport capabilities affecting transmission timing of at least one wireless link available for transmitting the application data 322, in accordance with the present invention. Preferably, the processing system 310 controls the server 124 to query the controller 112 about the data transport capabilities of the outbound link, e.g., link speed, latency, reliability, security, when the server 124 has application data 322 to be transmitted.

The mass medium 314 also includes a calculation program element 328 for programming the processing system 310 to calculate, from the information about the outbound link, a maximum amount of data that can be completed through the at least one wireless link by a predetermined time. The predetermined time can be, for example, a criterion stored in a user profile stored in a system entity accessible by the server 124. In this example, the criterion specifies how long the user is willing to wait for the application data 322 to be transmitted.

In addition, the mass medium 314 includes a determination element 330 for programming the processing system 310 to determine, when attainable, from the application data 322 and from a predetermined set of user-presentation formats possible for the application data 322, a user-presentation format that requires less than the maximum amount of data. For example, the predetermined set of user-presentation formats can include both high resolution and low resolution display of the application data 322. Depending upon the speed of the link(s) available, the user-presentation format may have to be low resolution in order to require less than the maximum amount of data for transmission.

The mass medium 314 further comprises a formatting element 332 for programming the processing system 310 to format the application data 322 in accordance with the user-presentation format selected before transmitting the application data. In addition, the mass medium 314 includes an access element 334 for programming the processing system 310 to access the user profile comprising predetermined criteria, e.g., the desired security, and the maximum waiting time for transmission, for calculating the maximum amount of data for a user; and to calculate the maximum amount of data from the predetermined criteria corresponding to the user. The user profile also preferably specifies selected ones of the predetermined set of user-presentation formats that are acceptable to a user, so that the processing system 310 can determine, from the application data 322 and from the selected ones of the predetermined set of user-presentation formats, a user-presentation format acceptable to the user that requires less than the maximum amount of data. The user profile preferably resides in a memory (not shown) of the controller 112. It will be appreciated that, alternatively, the user profile can reside in another entity of the wireless communication system, e.g., in the server 124.

FIG. 4 is a diagram depicting an exemplary link communication 400 in accordance with the present invention. The communication 400 comprises a message number 404 for coordinating responses with corresponding queries. The communication 400 also includes a message type indicator 406, e.g., link speed query, link speed response, link latency query, link latency response, followed by message parameters 408, e.g., link speed, link latency. Link queries are preferably sent end-to-end from a device having application data to send, e.g., the server 124 or the portable subscriber unit 122, to a predetermined entity of the wireless communication system having the desired link information, e.g., the controller 112 or the base station 116. Link responses then are returned from the predetermined entity to the device having the application data to send. It will be appreciated that more than one entity can provide information about the link, and that the device having application data to send can combine the information received from multiple entities. It will be further appreciated that the communication 400 will be further encapsulated in elements of the various protocols utilized by the wireless and wireline links through which the communication 400 passes.

FIG. 5 is a flow diagram 500 depicting operation of the wireless communication system in accordance with the present invention. The diagram 500 can be applied to any first entity in the wireless communication system that has application data to transmit to any second entity over at least one wireless link, and that accesses data transport information available from a third entity. To lend concreteness to the explanation of the diagram 500, however, the exemplary explanation will be made from the point of view of the server 124, which has application data to send to one of the portable subscriber units 122, and which accesses user profile and link information that resides in the controller 112. First, the processing system 310 of the server 124 accesses the information collection program element 324 to collect 502 information concerning data transport capabilities affecting transmission timing of at least one wireless link available for transmitting the application data, and further to collect reliability information concerning the transmission reliability of the at least one wireless link and cost information regarding the data unit transmission cost of the at least one wireless link. Next, the processing system 310 accesses 504 the user profile of the user associated with the application data to obtain the predetermined criteria of the user. Preferably, the server 124 obtains the information concerning data transport capabilities, the reliability information, the cost information, and the user profile, from the database of the controller 112 by sending a query in at least one link communication 400 to the controller 112, and receiving at least one link communication 400 in response from the controller 112. It will be appreciated that, alternatively, the server 124 can obtain some or all of the needed information from another designated entity of the wireless communication system.

Next, the server 124 calculates 506 from the information, the maximum amount of data that can be completed through the at least one wireless link by a predetermined time; and further limits, according to a data unit transmission cost corresponding to the at least one wireless link, the maximum amount of data to that which can be completed through the at least one wireless link at less than a predetermined cost. Preferably, both the predetermined time and the predetermined cost are designated in the user profile. It will be appreciated that, alternatively, default values can be used for the predetermined time and the predetermined cost, for example, when these items are not specified in the user profile.

Next the server 124 checks 508 whether it can determine, from the application data and from a predetermined set of user-presentation formats possible for the application data, a user-presentation format that requires less than the maximum amount of data (limited by the predetermined cost). It is worth noting that the word "possible" here means that the user-presentation format is both technically compatible with the application data, AND acceptable to the user, according the information obtained from the user profile. If at step 508 the server 124 can determine a suitable format, then the server 124 formats 514 the application data in accordance with the user-presentation format. If at step 508 the server 124 cannot determine a suitable format, then the server 124 defers 510 transmission of the application data and then waits 512 until it is time to check again, at which time the flow returns to step 502 to reevaluate the wireless links.

Once the server 124 has formatted the application data at step 514, the server then checks 516 whether the transmission reliability is less than that specified by the user. If so, the server 124 defers 518 transmission of the application data, and then waits 520 until it is time to check again, at which time the flow returns to step 502 to reevaluate the wireless links. If, on the other hand, at step 516 the server determines that the transmission reliability is not less than that specified by the user, then the server 124 obtains 522 information about the security of the link. Preferably, the security of the link is inherently determined from the transmission protocol used by the link, which is known to the server through the earlier communications 400 with the controller 112. The server then decides 524 whether or not to encrypt the application data, based upon the security of the link. The server 124 then checks 526 whether there are at least two links available that are satisfactory for the transmission of the application data. If not, the server transmits 530 the application data over the single satisfactory link. If there are at least two satisfactory links available, the server 124 selects 528 the lowest speed link and then transmits 530 the application data.

As an example of the process of the diagram 500, assume that there are two unsecured wireless links available for reliably transmitting the application data to the portable subscriber unit 122. The slower first link can send a maximum of 20 kilobytes (kb) of data within the predetermined time set by the user. The faster second link can send 200 kb. Transmission of the application data for presentation in full color on the second link requires 160 kb at a transmission cost of $1.00. Transmission in monochrome on the first link requires 20 kb and costs $0.10. The user profile indicates that no application data transmission shall cost more than $0.50. The server 124 thus determines that the application data will be encrypted and sent over the first link, and that the user-presentation format will be monochrome.

Thus, it should be clear from the preceding disclosure that the present invention provides a method and apparatus in a wireless communication system that dynamically formats application data to be transmitted, in response to variations in link capacity and quality. Advantageously, the method and apparatus also considers transmission cost and security, in deciding what user-presentation format to use, and is customizable for each user.

Many modifications and variations of the present invention are possible in light of the above teachings. For example, while the diagram 500 was explained for an example transmission of application data from the server 124 to the portable subscriber unit 122, the diagram 500, and the present invention, also apply to a transmission of application data from any entity of the wireless communication system to any other entity. In addition, while the exemplary embodiments have described display formats, audible formats can be dynamically formatted as well, in accordance with the present invention. Also, when the user is a device instead of a person, a still greater variety of user-presentation formats is possible. Thus, it is to be understood that, within the scope of the appended claims, the invention can be practiced other than as specifically described herein above.

What is claimed is:

1. A method in a wireless communication system for dynamically formatting application data to be transmitted, the method comprising the steps of:

collecting information concerning data transport capabilities affecting transmission timing of at least one wireless link available for transmitting the application data, said information including reliability information concerning a transmission reliability of the at least one wireless link;

calculating, from said information, a maximum amount of data that can be completed through the at least one wireless link by a predetermined time;

determining, when attainable, from the application data and from a predetermined set of user-presentation formats possible for the application data, a user-presentation format that requires less than said maximum amount of data;

formatting the application data in accordance with said user-presentation format before transmitting the application data;

comparing said transmission reliability with a desired transmission reliability specified by a user; and deferring transmission of the application data for said user when said transmission reliability is less than said desired transmission reliability, the transmission deferred until said transmission reliability is not less than said desired transmission reliability.

2. The method of claim 1, wherein the calculating step comprises the step of limiting, according to a data unit transmission cost corresponding to the at least one wireless link, said maximum amount of data to that which can be completed through the at least one wireless link at less than a predetermined cost.

3. The method of claim 1, further comprising the step of accessing a user profile comprising predetermined criteria for calculating said maximum amount of data for a user, and wherein the calculating step comprises the step of calculating said maximum amount of data from said predetermined criteria corresponding to the user.

4. The method of claim 1, further comprising the step of accessing a user profile that specifies selected ones of said predetermined set of user-presentation formats that are acceptable to a user, wherein the determining step comprises the step of determining, from the application data and from said selected ones of said predetermined set of user-presentation formats, the user-presentation format acceptable to the user that requires less than said maximum amount of data.

5. The method of claim 1, further comprising, when at least two wireless links are available that can support the application data formatted in said user-presentation format, the step of transmitting the application data through one of said at least two wireless links having a lowest transmission speed.

6. The method of claim 1, wherein the determining step determines that no user-presentation format requires less than said maximum amount of data, and wherein the method comprises the steps of:
deferring transmission of the application data;
repeating the determining step at predetermined later times until determining said user-presentation format that requires less than said maximum amount of data; and
then transmitting the application data in said user-presentation format.

7. The method of claim 1, further comprising the steps of:

obtaining additional information concerning security of the at least one wireless link; and deciding whether to encrypt the application data based upon said additional information.

8. A server in a wireless communication system for dynamically formatting application data to be transmitted, the server comprising:

a network interface for communicating the application data with a portion of the wireless communication system, which will transmit the application data over at least one wireless link available for transmitting the application data; and a processing system coupled to the network interface for processing the application data;

wherein the processing system is programmed to:
collect information concerning data transport capabilities affecting transmission timing of said at least one wireless link, said information including reliability information concerning a transmission reliability of the at least one wireless link;

calculate, from said information, a maximum amount of data that can be completed through the at least one wireless link by a predetermined time;

determine, when attainable, from the application data and from a predetermined set of user-presentation formats possible for the application data, a user-presentation format that requires less than said maximum amount of data;

format the application data in accordance with said user-presentation format before transmitting the application data;

compare said transmission reliability with a desired transmission reliability specified by a user; and defer transmission of the application data for said user when said transmission reliability is less than said desired transmission reliability, the transmission deferred until said transmission reliability is not less than said desired transmission reliability.

9. The server of claim 8, wherein the processing system is further programmed to limit, according to a data unit transmission cost corresponding to the at least one wireless link, said maximum amount of data to that which can be completed through the at least one wireless link at less than a predetermined cost.

10. The server of claim 8, wherein the processing system is further programmed to:

access a user profile comprising predetermined criteria for calculating said maximum amount of data for a user, and calculate said maximum amount of data from said predetermined criteria corresponding to the user.

11. The server of claim 8, wherein the processing system is further programmed to access a user profile that specifies selected ones of said predetermined set of user-presentation formats that are acceptable to a user; and determine, from the application data and from said selected ones of said predetermined set of user-presentation formats, the user-presentation format acceptable to the user that requires less than said maximum amount of data.

12. The server of claim 8, wherein the processing system is further programmed, when at least two wireless links are available that can support the application data formatted in said user-presentation format, to transmit the application data through one of said at least two wireless links having a lowest transmission speed.

13. The subscriber unit of claim 11, wherein the processing system is further programmed to limit, according to a data unit transmission cost corresponding to the at least one wireless link, said maximum amount of data to that which can be completed through the at least one wireless link at less than a predetermined cost.

14. The server of claim 8, wherein the processing system is further programmed, in response to determining that no user-presentation format requires less than said maximum amount of data, to:

defer transmission of the application data;

continue checking at predetermined later times until finding said user-presentation format that requires less than said maximum amount of data; and then transmit the application data in said user-presentation format.

15. A subscriber unit in a wireless communication system for dynamically formatting application data to be transmitted, the subscriber unit comprising:

a receiver for receiving information concerning data transport capabilities affecting transmission timing of at least one wireless link available for transmitting the application data;

a processing system coupled to the receiver for processing the information; and a transmitter coupled to the processing system for transmitting the application data over the at least one wireless link, wherein the processing system is programmed to:

collect said information, including reliability information concerning a transmission reliability of the at least one wireless link;

calculate, from said information, a maximum amount of data that can be completed through the at least one wireless link by a predetermined time;

determine, when attainable, from the application data and from a predetermined set of user-presentation formats possible for the application data, a user-presentation format that requires less than said maximum amount of data;

format the application data in accordance with said user-presentation format before transmitting the application data;

compare said transmission reliability with a desired transmission reliability specified by a user; and defer transmission of the application data for said user when said transmission reliability is less than said desired transmission reliability, the transmission deferred until said transmission reliability is not less than said desired transmission reliability.

16. The subscriber unit of claim 14, wherein the processing system is further programmed to:

access a user profile comprising predetermined criteria for calculating said maximum amount of data for a user, and calculate said maximum amount of data from said predetermined criteria corresponding to the user.

17. The subscriber unit of claim 14, wherein the processing system is further programmed, when at least two wireless links are available that can support the application data formatted in said user-presentation format, to transmit the application data through one of said at least two wireless links having a lowest transmission speed.

18. The subscriber unit of claim 15, wherein the processing system is further programmed to access a user profile that specifies selected ones of said predetermined set of user-presentation formats that are acceptable to a user; and determine, from the application data and from said selected ones of said predetermined set of user-presentation formats, the user-presentation format acceptable to the user that requires less than said maximum amount of data.

19. The subscriber unit of claim 14, wherein the processing system is further programmed, in response to determining that no user-presentation format requires less than said maximum amount of data, to:

defer transmission of the application data;

continue checking at predetermined later times until finding said user-presentation format that requires less than said maximum amount of data; and then transmit the application data in said user-presentation format.

* * * * *